United States Patent [19]

Yasunaga et al.

[11] Patent Number: 4,878,555
[45] Date of Patent: Nov. 7, 1989

[54] AIR INTAKE DEVICE FOR A VEHICLE ENGINE

[75] Inventors: Osamu Yasunaga, Saitama; Kazuharu Wakusaka, Tokyo; Fumio Inomata; Toshio Tsuchiya, both of Saitama, all of Japan

[73] Assignee: Honad Giken Kogyo Kabushiki Kaisha, Tokyo, Japan

[21] Appl. No.: 104,543

[22] Filed: Sep. 30, 1987

Related U.S. Application Data

[63] Continuation of Ser. No. 808,003, Dec. 12, 1985, abandoned.

[30] Foreign Application Priority Data

Dec. 13, 1984 [JP] Japan .................................. 59-263666
Jul. 2, 1985 [JP] Japan .................................. 60-145224
Jul. 19, 1985 [JP] Japan .................................. 60-159464

[51] Int. Cl.$^4$ ............................................ B60K 13/02
[52] U.S. Cl. ....................................... 180/68.3; 55/419
[58] Field of Search ................ 55/419; 180/68.1, 68.2, 180/68.3, 229

[56] References Cited

U.S. PATENT DOCUMENTS

| 3,043,390 | 7/1962 | Lattay | 180/68.1 |
| 4,235,298 | 11/1980 | Sackett | 180/68.3 |
| 4,354,458 | 10/1982 | Bury | 180/68.3 X |
| 4,420,057 | 12/1983 | Omote et al. | 180/68.3 |
| 4,533,012 | 8/1985 | Komoda | 180/68.3 |

FOREIGN PATENT DOCUMENTS 1023124 3/1953 France .............................. 180/68.3

Primary Examiner—Charles A. Marmor
Assistant Examiner—Michael Mar
Attorney, Agent, or Firm—Lyon & Lyon

[57] ABSTRACT

In a vehicle in which an air cleaner is disposed above an engine and connected with the engine through an intake pipe, an air intake passage for guiding air into the air cleaner is provided on the upper surface of a front fender covering a front wheel of the vehicle, so that particulates such as dust or the like entrained in running air is separated from the running air to admit the air free of the particulates into the air cleaner.

15 Claims, 10 Drawing Sheets

AIR INTAKE DEVICE FOR A VEHICLE ENGINE

This application is a continuation of application Ser. No. 808,003 filed Dec. 12, 1985, now abandoned.

BACKGROUND OF THE INVENTION

1. Field of the Invention

The present invention relates to an air intake device for an engine in a vehicle including a pair of left and right front wheels and front fenders covering the upper surfaces of the front wheels.

2. Description of the Prior Art

In general, a vehicle travelable on rough, damp or snowy lands and roads may be allowed to run with most of the running wheels submerged in some cases. For this reason, in such a vehicle, it is necessary for an air intake portion of an intake system in a driving engine carried on a vehicle body to be disposed at a level higher than those of the running wheels. A vehicle of such an arrangement, in which an air intake port in an intake system of an engine is provided just below a seat for an occupant disposed at the upper portion of a vehicle body, is conventionally known as disclosed in Japanese Patent Application Laid-open No. 421/83.

In the above conventional vehicle, however, there is a problem that the position of the seat may be raised to a higher level because of the air intake port provided just below the seat. If the seat is made thinner to overcome this problem, another problem of a degraded cushioning property of the seat may arise. Further, because auxiliary equipments such as a carburetor in the intake system of the driving engine, an air cleaner, a damper of the rear wheel suspension, a battery, etc., are crowded below the seat, there is a still further problem of a space insufficient to provide the air intake port of the intake system just below the seat.

In addition, the conventional vehicle is also accompanied by another problem that mud, dust, snow or the like upflung during traveling of the vehicle enters the intake system to give rise to the early clogging of a cleaner element of the air cleaner in the intake system, resulting in an increased frequency in replacement, washing or the like of the cleaner element.

SUMMARY OF THE INVENTION

The present invention has been accomplished with the above circumstances in view, and it is therefore and object of the present invention to provide an air intake device for vehicle engine, which has a simplified arrangement and enables all the above problems to be overcome.

According to the present invention, the above object is achieved by providing an air intake device for a vehicle engine wherein an air intake passage is provided on the upper surface of a front fender covering a front wheel on a vehicle body, and an air induction port is opened in one wall constituting the air intake passage and is in communication with an air cleaner connected to an intake pipe of an engine.

With the above arrangement, particulates such as mud, dust, snow or the like having a specific gravity greater than that of air and blown toward the air intake passage together with running air during traveling of the vehicle is passed through the air intake passage without stopping by the inertia thereof to flow rearwardly from such passage. Therefore, they can not be sucked into the intake system, and only the open air is sucked into the intake system of the engine via the air induction port provided in one wall of the air intake passage.

Thereupon, the running air is guided by the front fender free from any obstacle to enter the air intake passage with less resistance, and the particulates such as mud, dust, snow or the like having a specific gravity greater than that of air are separated in the air intake passage, so that the open air substantially free of the pariculates can be introduced into the air cleaner. Thus, the fouling of the air cleaner due to the particulates can be reduced to diminish the frequency in washing and replacement thereof.

In addition, the air intake passage may be avoided to be provided below the seat as in the prior art and therefore, the position of the seat may not be at a higher level, thereby making it possible to avoid the formation of a thinner seat which causes a degraded comfort.

BRIEF DESCRIPTION OF THE DRAWINGS

The above and other objects, features and advantages of the present invention will become apparent from the following description of preferred several embodiments taken in conjunction with the accompanying drawings in which.

DESCRIPTION OF THE PREFERRED EMBODIMENTS

The present invention will now be described by way of several embodiments applied in a four-wheel saddle riding type vehicle with reference to the drawings.

Figure 1:
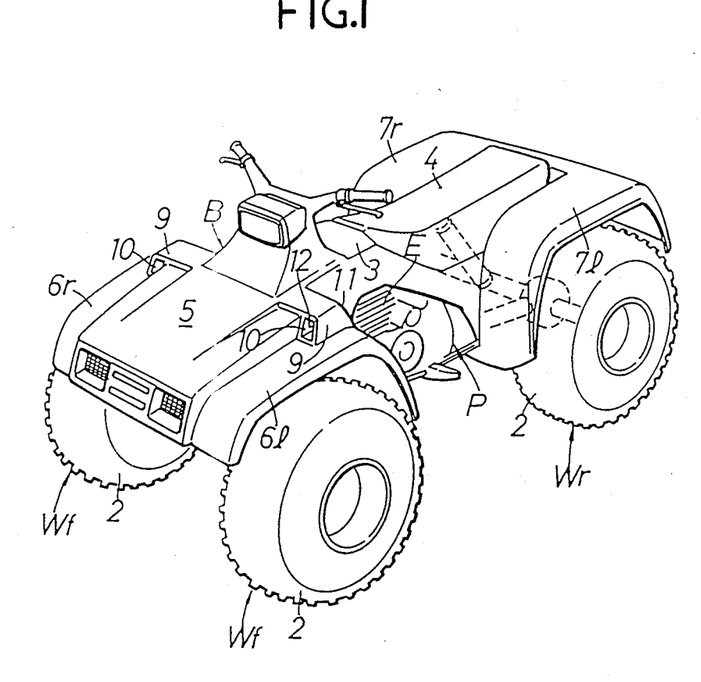
FIG. 1 is a perspective view of a four-wheel saddle riding type vehicle equipped with an air intake device according to a first embodiment of the present invention.
Figure 2:
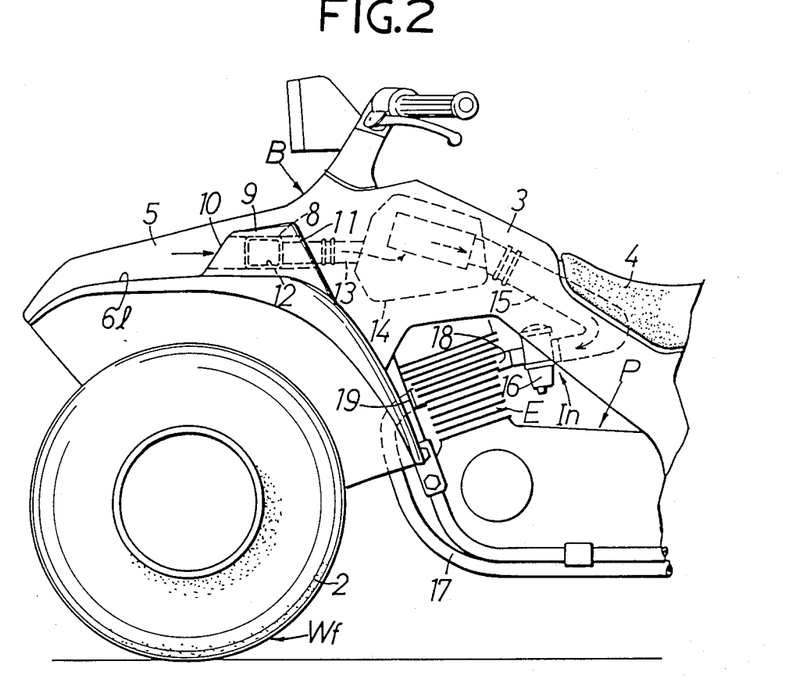
FIG. 2 is a side view of the details of the device.
Figure 3:
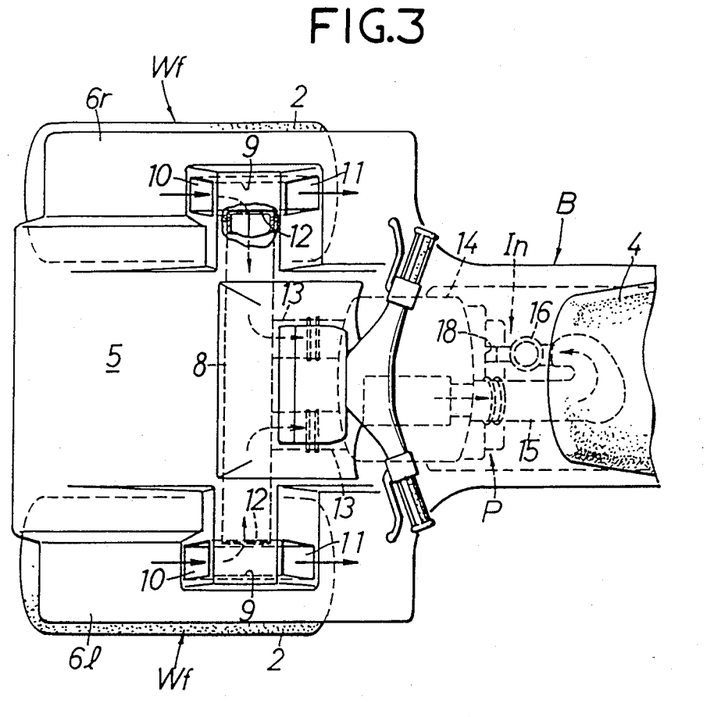
FIG. 3 is a plan view of the details.

Referring to FIGS. 1 to 3 which illustrate a first embodiment, a power unit P including an engine E is carried on the central portion of a body B of a four-wheel saddle riding type vehicle, and a pair of steerable front wheels Wf are suspended on the vehicle body B at its left and right front portions and a pair of rear wheels Wr are at its left and right rear portions. Each the pairs of front and rear wheels Wf and Wr is equipped with a wide extremely low pressure tire 2. On the vehicle body B there are disposed an air cleaner cover 3 and a seat 4 for an occupant behind the air cleaner cover 3. A bonnet 5 is disposed at the front and laterally central portion of the vehicle body B to serve as upper surface of the latter, and left and right front fenders 6l and 6r are secured to the vehicle body B at the left and right sides of the bonnet 5 to cover the the upper surfaces of the left and right front wheels Wf, respectively. Left and right rear fenders 7l and 7r are also secured to the vehicle body B on the opposite sides of the seat 4 to cover the upper surfaces of the left and right rear wheels Wr, respectively.

Description will now be made of an air intake system in connected to the engine E.

At the front portion of the vehicle body B, an air induction passage 8 is provided inside the bonnet 5 across the latter. The left and right opposite ends of the air induction passage 8 reach the points above the left and right front fenders 6l and 6r, and left and right air intake passages 9 are defined at such opposite ends in an integral relationship with the air induction passage 8, respectively. Each the air intake passages 9 is shaped into a rectangular column configuration extending in the longitudinal direction of the vehicle body B and has an inlet 10 and an outlet 11 opened respectively at its front and rear ends and opposed to each other. An air induction port 12 is opened in the inner wall of each air intake passage 9 in a direction substantially perpendicular to the flow of air passing through the passage 9, and is in communication with the air induction passage 8.

As clearly shown in FIG. 3, on the way of the air induction passage 8 there are two air distribution passages 13 extending in substantially parallel with each other toward the rear portion of the vehicle body B and having rear ends communicating with the inlet of an air cleaner 14 disposed above the engine. An air intake pipe 15 is in communication with the outlet of the air cleaner 14. The intake pipe 15 extends rearwardly and downwardly below the air cleaner cover 3 and the seat 4, and is then curved forwardly in a U-shaped side section and connected through a carburetor 16 to an intake port 18 of the engine E.

An exhaust pipe 17 is connected to an exhaust port 19 in the front surface of the engine E. The exhaust pipe 17 extends downwardly in front of the engine E and then rearwardly, and connected to an exhaust muffler now shown.

The operation will now be described of the first embodiment.

Now, as the vehicle travels, running air flows along the upper surfaces of the left and right front fenders 6l and 6r, and a part of the running air enters the left and right air intake passages 9 in a direction indicated by arrows of solid line in FIGS. 2 and 3. A negative intake pressure in the engine E causes the open air flowing in the left and right intake passages 9 to be sucked into the air induction passage 8, as shown by arrows of dotted line, and passed from the passage 8 through the distribution passages 13 into the air cleaner 14 where the open air is cleaned. Then, it is passed through the intake pipe 15 into the carburetor 16 where an air-fuel mixture is produced and sucked into the intake port 18 of the engine E.

Now, when the vehicle is traveling on a rough, damp snowy land or road, particulates such as mud, dust, splash and snow may enter the air intake passages 9, but because the particulates have a specific gravity greater than that of air, they may forcibly pass through the left and right air intake passages 9 without stopping by the inertia thereof and may be thrown rearwardly out of the passages 9 and thus, they can not be sucked into the air induction passage 8 in most cases. Therefore, the open air substantially free from such particulates is sucked into the air cleaner 14 and cleaned therein and thereafter, it is sucked through the carburetor 16 into the engine E.

Figure 4:
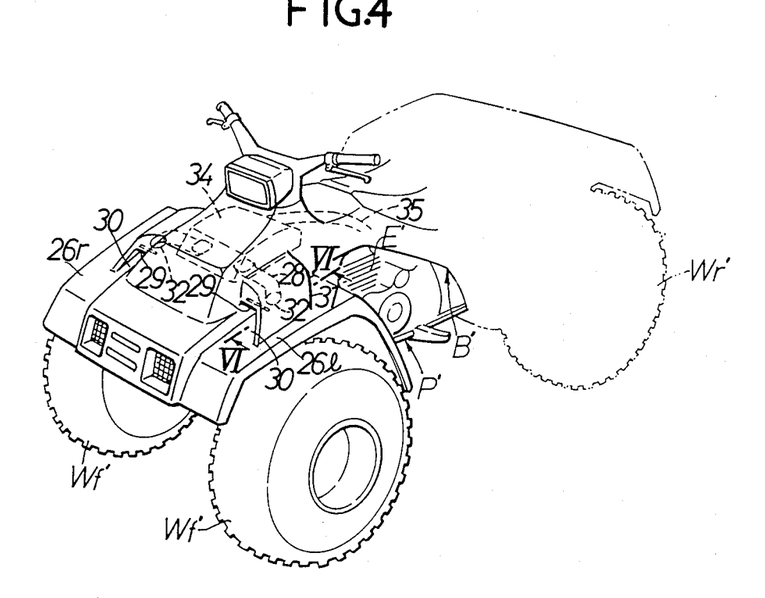
FIG. 4 is a partially omitted perspective view of a four-wheel saddle riding type vehicle equipped with a device according to a second embodiment.
Figure 5:
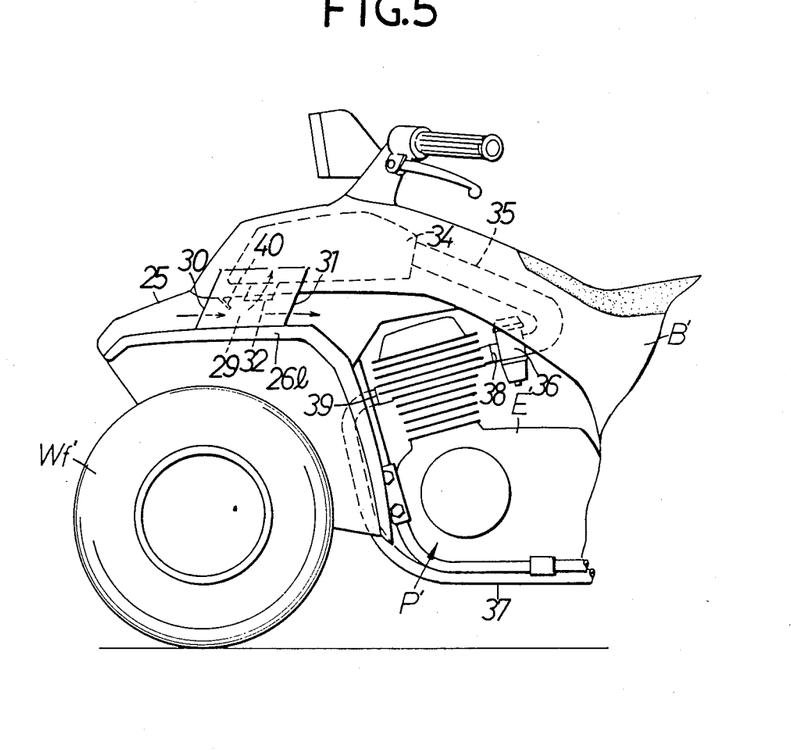
FIG. 5 is a side view of the front portion of the vehicle.
Figure 6:
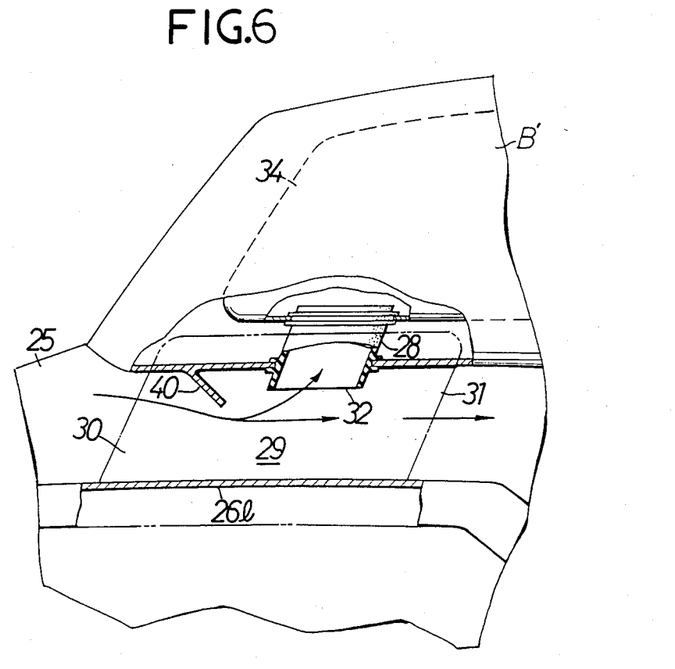
FIG. 6 is a side view in vertical section of the device.

Referring to FIGS. 4 to 6 which illustrate a second embodiment, an air cleaner 34 connected through an intake pipe 35 and a carburetor 36 to an engine E' of a power unit P' is disposed extending over the engine E' and left and right front fenders 26l and 26r.

Left and right air intake passages 29 are provided on the pair of left and right front fenders 26l and 26r, respectively. Each the air intake passages 29 extends on the front fender 26l or 26r in the longitudinal direction of the vehicle and has an inlet 30 opened at its front end and an outlet 31 opened at its rear end. As seen in FIG. 6, an air induction port 32 is opened in the upper wall of the air intake passage 29 and connected to the inlet of the air cleaner 34 through a conduit 28 constituting an air induction passage. In front of the air induction port 32, a guide plate 40 is suspended from the upper wall of the air intake passage 29 and inclined downwardly and rearwardly to cover the air induction port 32 from the front portion of the passage 29, so that air entering the air intake passage 29 may be guided downwardly and rearwardly by the guide plate 40.

Now, as the vehicle travels, running air flows along the upper surfaces of the left and right front fenders 26l and 26r, and a part of the running air enters the left and right air intake passage 29. On the other hand, a negative intake pressure developed upon the operation of the engine E causes air flowing in the left and right air intake passages 29 to be passed via the conduits 28 into the air cleaner 34 where it is cleaned. Thereafter, the cleaned air is passed via the intake pipe 35 into the carburetor 36 where an air-fuel mixture is produced and sucked into the engine E'.

In the second embodiment, even if particulates such as mud, dust, splash and snow are entrained in the running air introduced into the air intake passages 29, they are guided slightly downwardly within the air intake passages 29 by the guide plate 40 to pass through the passages 29 without stopping and is discharged out rearwardly therefrom, so that it can be hardly sucked through the air induction port 32 into the air cleaner 34. Therefore, further effective introduction of air is achieved.

Figure 7:
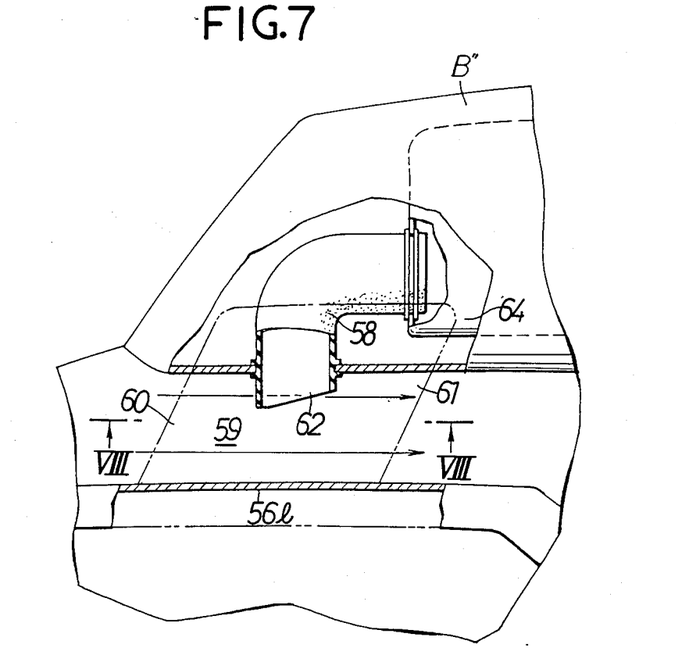
FIGS. 7 and 8 illustrate a third embodiment of the present invention, FIG. 7 being a side view in vertical section of the device and FIG. 8 being a cross-sectional view taken along the line VIII—VIII in FIG. 7.
Figure 8:
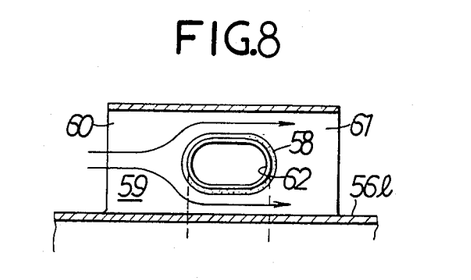
Figure 9:
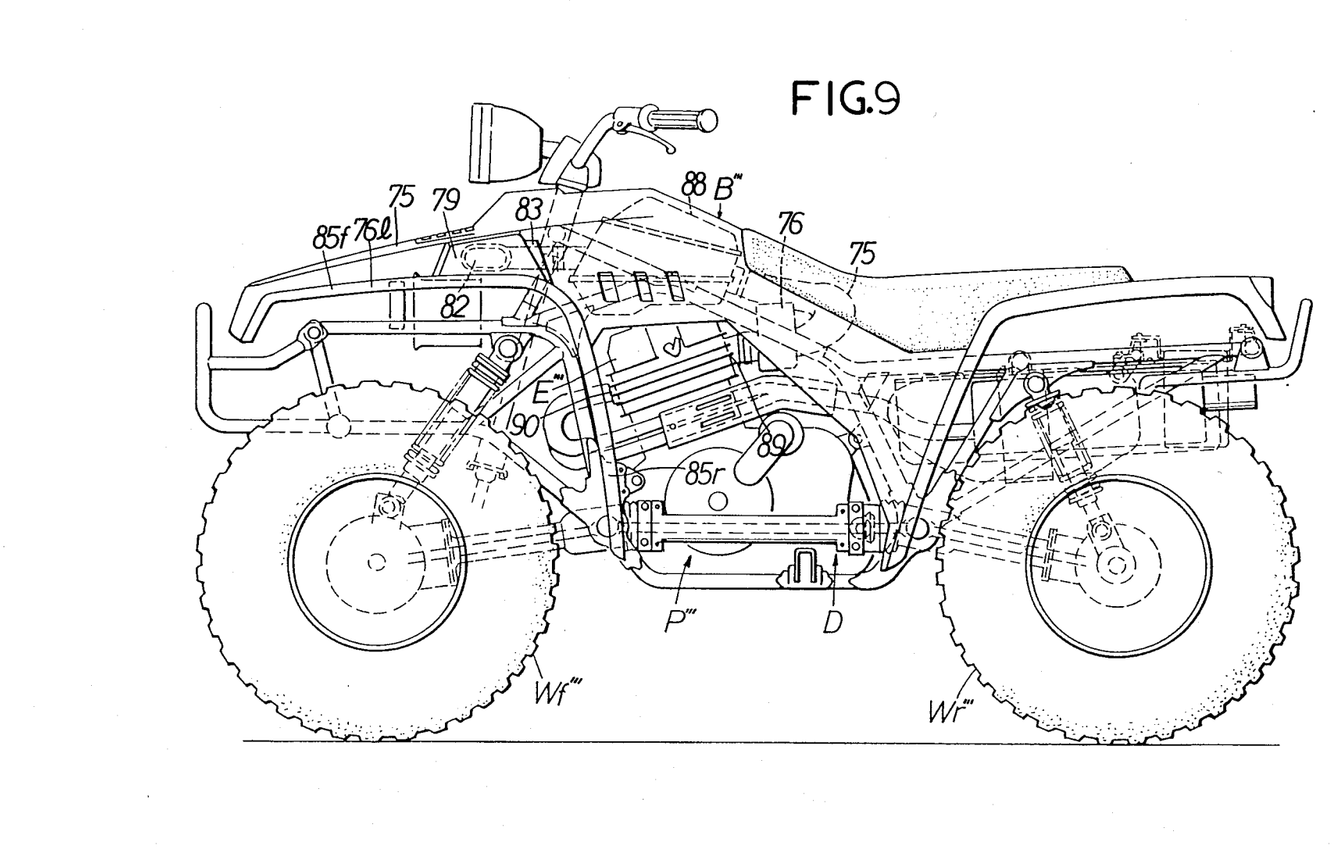
FIG. 9 is a side view of a four-wheel saddle riding type vehicle equipped with a device according to a fourth embodiment.

FIGS. 7 and 8 inllustrate a third embodiment of the present invention.

In this embodiment, an air induction port 62 is made in the upper wall of an air intake passage 59. The air induction port 62 is defined by that open end of a conduit 58 connected to an air cleaner 64 which is closer to the air intake passage 59, and is in an oval configuration long in the longitudinal direction of the vehicle while being inclined upwardly towards rear in such a manner that the opened face of the air intake port 62 may turn its back on an inlet 60 and may be directed to an outlet 61.

With the above arrangement, the particulates entrained in the running air entering the air intake passage 59 is allowed to come into collision with the front wall at the lower end of the conduit 58 and guided downwardly for rearward release, so that it may not enter the conduit 58.

In a fourth embodiment shown in FIGS. 9 to 12, a saddle riding type vehicle is in a four wheel drive fashion, with front and rear wheels Wf''' and Wr''' driven by a drive system D connected to the output end of a power unit P''', respectively.

Figure 11:
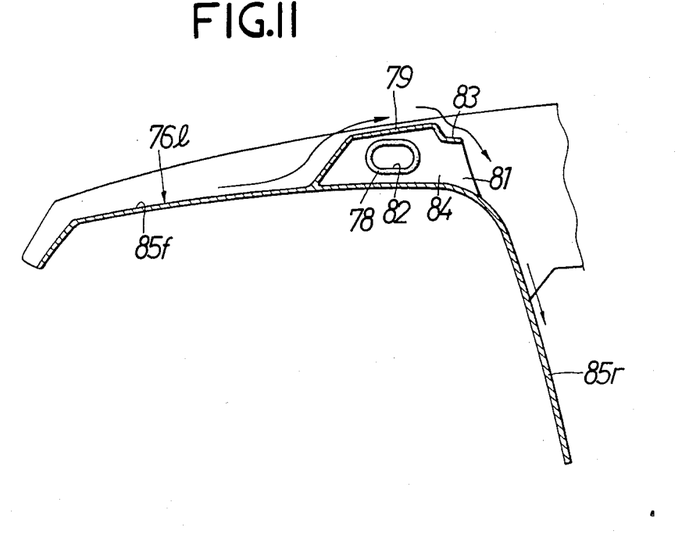
FIG. 11 is a vertical sectional view taken along the line XI—XI in FIG. 10.

Left and right front fenders 76*l* and 76*r* are provided at the front portion of a vehicle body B''' to cover the pair of front wheels Wf'''. As shown in FIG. 11, each the front fenders 76*l* and 76*r* consists of a substantially horizontal front half 85f and a rear half 85r inclined rearwardly and downwardly from the front half with a steep slope. A bonnet 75 is disposed between the left and right front fenders 76*l* and 76*r* to form the upper surface at the front portion of the vehicle body B'''.

Figure 12:
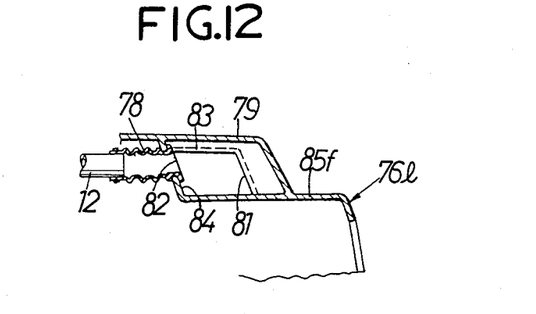
FIG. 12 is a vertical sectional view taken along the line XII—XII in FIG. 10.

The pair of left and right front fenders 76*l* and 76*r* have left and right air intake chambers 79 provided thereon. respectively. Each the air intake passages 79 extends rearwardly on the front fender 76*l* or 76*r* and is made in a channel-shaped form in cross section as shown in FIGS. 11 and 12, with its front end closed and its rear end having a square air intake port 81 opened therein. At the air intake port 81 there is a canopy or eaves 83 extending rearwardly over the upper edge and opposite side edges thereof. The end surface of the canopy 83 is substantially flush with the outer surface of the rear half 85r of each the front fenders 76*l* and 76*r*, as shown in FIG. 11.

Figure 10:
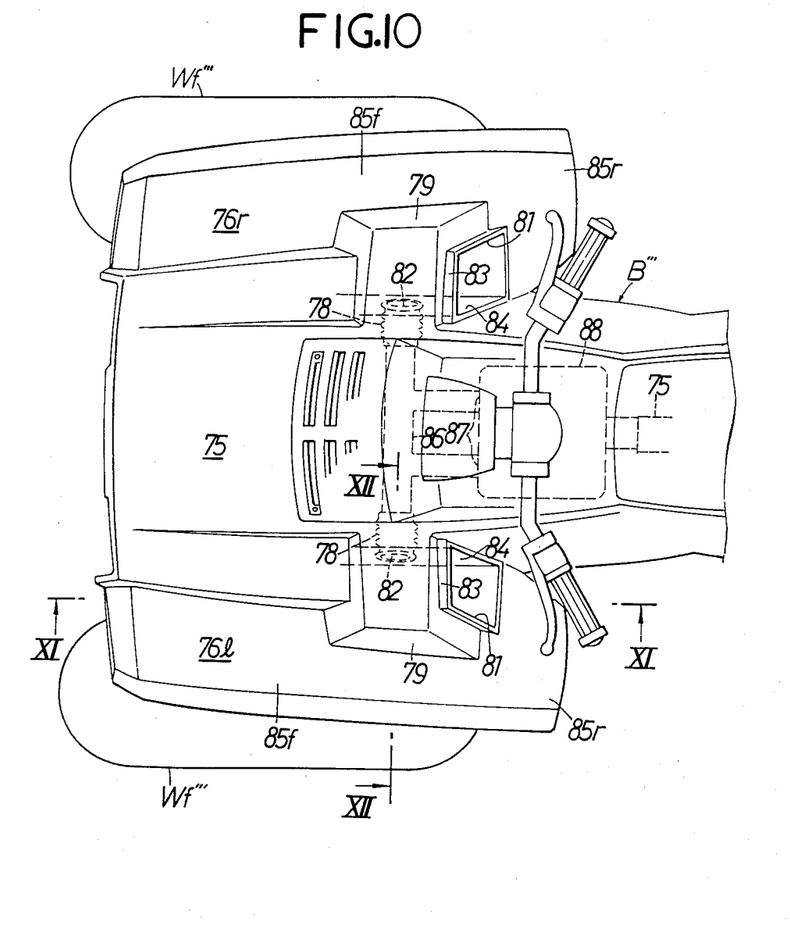
FIG. 10 is a plan view of the front portion of the vehicle.

Air induction ports 82 are opened in the opposed inner walls 84 of the left and right air intake chambers 79 and connected to the inlets 87 of an air cleaner 88 through connecting pipes 78 and conduits 86 constituting air induction passages, respectively.

The following is the description of operation of the fourth embodiment.

Now, upon the traveling of the vehicle, running air flowing along the upper surfaces of the left and right front fenders 76*l* and 76*r* is passed rearwardly along the upper surfaces of the air intake chambers 79 as indicated by an arrow in FIG. 11, but it does not enter immediately the air intake chambers 79 because the front end face of each the air intake chambers 79 is closed.

A negative intake pressure developed upon the operation of the engine E''' acts on the interior of the left and right air intake chambers 79 through the conduits 86 and the connecting pipes 78, so that the open air is sucked into the air intake chambers 79 through the air intake ports 81 and passed into the air cleaner 88.

When the vehicle is traveling on rough, damp, soft or snowy land, particulates such as splash, mud, dust and snow entrained in the running air in a relatively large amount are guided to the canopy 83 and blown off rearwardly as the running air flows along the upper surface of the each air intake chamber 79. In this way, the particulates are hard to enter the air intake chamber 79, and only the air is sucked into the chamber 79 around the canopy 83 and through the air intake port 81. Conjointly with the running air not entering immediately the air intake chamber 79 through its front end, the air from which the particulates have been separated may be effectively sucked into the air intake chamber 79.

The particulates remaining on the canopy 83 can be dropped from the vehicle body B''' along the rear surface of the steeply inclined rear half 85r of each the front fenders 76*l* and 76*r*.

One air intake chamber has been provided for each of the left and right front fenders in the above embodiments, but one of them may be omitted and only a single air intake chamber may be provided.

What is claimed is:

1. An air intake device for an engine in a vehicle including a body provided with a front wheel, an engine carried on said vehicle body, an air cleaner connected to an intake pipe of the engine and disposed above the engine, and a front fender provided at a front portion of said vehicle body to cover an upper surface of said front wheel, said upper front fender having an upper surface, comprising an air intake chamber of a predetermined volume provided on said upper surface of the front fender defining a closed channel extending generally in the direction of movement of the vehicle having top, bottom, and side walls, and having at least one intake port, said one intake port opening to the vehicle and a conduit connecting said air intake chamber to an inlet of the air cleaner, said conduit including an air induction passage extending from said air intake passage to the air cleaner of said engine, said air induction passage joining with said air intake passage at a first end of said air induction passage to define a port through a side wall of said air intake passage at a substantial angle to the flow direction of said air intake passage, said port having a cross sectional area substantially less than the transverse cross sectional area of said air intake passage at said port the intersection of said port with a side wall of said air intake passage being spaced above said bottom wall.

2. An air intake device according to claim 1, wherein said front wheel is in the form of a pair of left and right front wheels, and said front fender is in the form of a pair of left and right front fenders between which a bonnet is interposed, and wherein said air intake is provided passage on each of the pair of front fenders at a connection between the upper surfaces of the front fenders and left and right side walls of said bonnet.

3. An air intake device according to claim 2, wherein said port is opened in said left and right side walls of said bonnet.

4. An air intake device according to claim 2, wherein said air intake passage has an upper wall extending in a substantially horizontal direction from the side wall of said bonnet and an outer side wall extending downwardly from the outside of said upper wall and connected to the upper surface of said front fender, and said air induction means is provided in said upper wall of said air intake passage.

5. An air intake device according to claim 2 or 3, wherein said air induction passage comprises a laterally extending portion and a longitudinally extending portion which branches from a laterally intermediate part of the laterally extending portion and leads to said inlet of the engine.

6. An air intake device according to claim 1, wherein said closed channel includes an intake port which opens to the outside in a direction opposite to an advancing direction of the vehicle wherein eaves are provided to surround said air intake port.

7. An air intake device according to claim 6, wherein said front fender has a rear portion inclined rearwardly and downwardly at the rear of the air intake port.

8. An air intake device according to claim 7, wherein said eaves have an end surface which is set substantially flush with the surface of the rear portion of the front fender.

9. An air intake device according to claim 8, wherein said air intake passage is closed at one end forwardly of said air intake passage on the vehicle.

10. An air intake device according to claim 6, wherein said air intake passage is closed at one end forwardly of said air intake passage on the vehicle.

11. An air intake device according to claim 1, wherein said front fender has a rear portion inclined rearwardly and downwardly at the rear of the air intake passage.

12. An air intake device according to claim 1, wherein said air intake passage is closed at one end forwardly of said air intake passage on the vehicle.

13. An air intake device according to claim 1 wherein the intersection of said port with the wall of said intake passage is at a substantial angle about a substantial portion of the periphery of said port.

14. An air intake device according to claim 1, further comprising a second intake port opening to the outside in a direction toward an advancing direction of the vehicle.

15. A vehicle having an air intake device, comprising a straddle type vehicle body;
left and right front wheels rotatably mounted relative to said body;
left and right front fenders positioned over said front wheels;
an engine centrally mounted in said body;
a rider position defined on said body and including footpegs, said footpegs being located directly rearwardly of said front wheels;
an air intake chamber defined by top, bottom, and side walls provided on the upper surface of each said front fender defining an air intake passage extending generally in the direction of movement of the vehicle;
air induction passages extending from each said air intake passage to an air cleaner of said engine, said air induction passages each joining with said air intake passages at a first end of each said air induction passage to define ports through a side wall of each said air intake passage at a substantial angle to the flow direction of said intake passages, said ports having cross sectional areas substantially less than the transverse cross sectional areas of said air intake passages at said ports and the intersections of each said port with side walls of said air intake passages being spaced above said bottom walls.

* * * * *

UNITED STATES PATENT AND TRADEMARK OFFICE
CERTIFICATE OF CORRECTION

PATENT NO. : 4,878,555
DATED     : November 7, 1989
INVENTOR(S) : Osamu Yasunaga et al.

It is certified that error appears in the above-identified patent and that said Letters Patent is hereby corrected as shown below:

In claim 1 (column 6, line 13) after "the" insert -- outside in a direction opposite to an advancing direction of the --.

In claim 2 (column 6, line 30) after "intake" insert -- passage --.

In claim 2 (column 6, line 31) delete "passage".

Signed and Sealed this

Sixth Day of November, 1990

Attest:

HARRY F. MANBECK, JR.

*Attesting Officer*    Commissioner of Patents and Trademarks